United States Patent [19]

Föhl

[11] Patent Number: 4,582,340
[45] Date of Patent: Apr. 15, 1986

[54] TURNING FITTING FOR SAFETY BELTS IN MOTOR VEHICLES

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 579,812

[22] Filed: Feb. 13, 1984

[30] Foreign Application Priority Data

Feb. 22, 1983 [DE] Fed. Rep. of Germany ....... 3306095

[51] Int. Cl.[4] ............................................ B60R 22/00
[52] U.S. Cl. .................................... 280/808; 297/483
[58] Field of Search .......................... 280/808; 242/76; 297/483

[56] References Cited

U.S. PATENT DOCUMENTS 4,062,484 12/1977 Rausch et al. ...................... 242/76
4,211,432 7/1980 Furukawa et al. ................. 280/808

FOREIGN PATENT DOCUMENTS 2828399 1/1980 Fed. Rep. of Germany ...... 280/808

Primary Examiner—Joseph F. Peters, Jr.
Assistant Examiner—Kenneth R. Rice
Attorney, Agent, or Firm—Yount & Tarolli

[57] ABSTRACT

A turning fitting for a safety belt includes a pair of leg sections which extend downward from a mounting section and are connected with opposite end portions of a turning section. The turning section includes a plastic casing. The plastic casing has a surface covered with a coating of low friction material. In one specific instance, the low friction material coating was a metal coating which was deposited by vapor deposition.

2 Claims, 3 Drawing Figures

TURNING FITTING FOR SAFETY BELTS IN MOTOR VEHICLES

The invention relates to a turning fitting for a safety belt.

It is known, in such turning fittings, to cover the plastic body with a metal sheath, in order to reduce the friction values of the plastic body.

It is also known to develop the surfaces of such metal sheaths by suitable shaping of the surface to reduce friction.

The production of the known turning fittings is very costly, however.

The invention attacks the problem, therefore, of producing a turning fitting of the kind described more economically.

The metal or non-metal coating of the plastic body can be done much more economically in mass production, than the application of a metal sheath on the plastic body.

It is also simpler to roughen the plastic body before the coating, to reduce the friction values, in which case the roughnesses caused in production can also be utilized.

In the case of non-metal coatings, with polysiloxane, for example, it is possible to mix a solid component with the coating means, to form, after the hardening of the coating means, an uneven, and thus a friction-reducing surface.

These admixtures may preferably consist of small metal or non-metal balls. Instead of injection, a spraying process may be used.

Examples of the execution of the invention are shown in the drawings.

Figure 1:
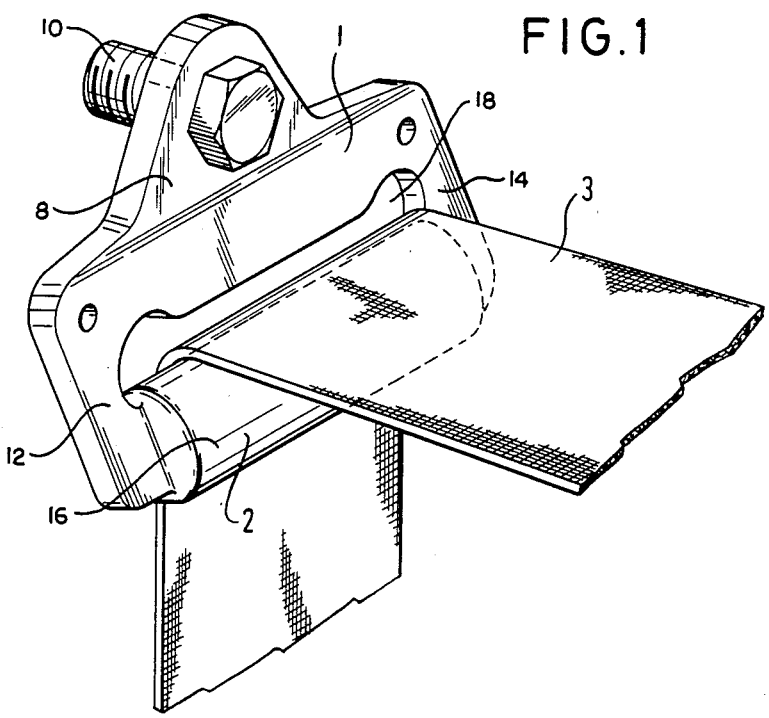
FIG. 1 shows a turning fitting with belt band passed through it, in perspective.
Figures 2, 3:
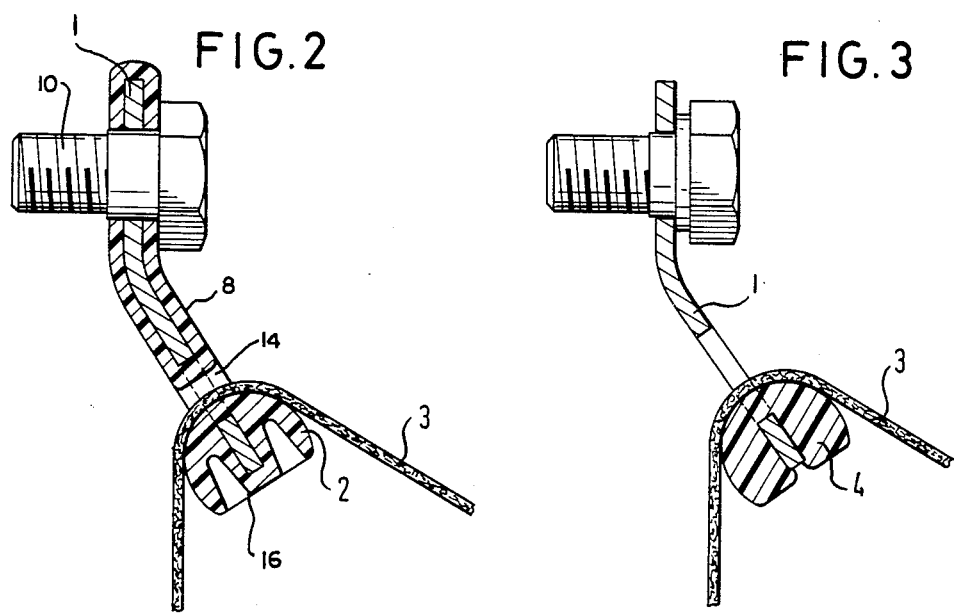
FIG. 2 is a representation according to FIG. 1, in section.
FIG. 3 shows a turning fitting with plastic body (casing) placed on it.

The turning fitting 1 according to FIGS. 1 and 2 is jacketed by a plastic casing 2. This plastic casing 2 is coated, at least in the zone in contact with the belt band 3, with a friction reducing surface. This coating may, for reasons of production technology, also cover other zones of the plastic casing 2.

In the example of execution according to FIG. 3, there is placed on the turning fitting 1 a plastic casing 4 which also has a friction-reducing surface coating in the turning zone of the belt 3.

It is also possible in this example of execution, for simplifying production, to coat the whole surface of the plastic casing 4.

The turning fitting 1 has a mounting section 8 which is connected with a suitable fastener 10. A pair of leg sections 12 and 14 extend downwardly from the mounting section 8 and are connected with opposite end portions of a turning section 16. The mounting section 8, leg sections 12 and 14 and turning section 16 cooperate to define a slot 18 through which the safety belt 3 extends.

The turning section 16 includes the plastic casing 2. The plastic casing 2 has a surface covered with a coating of low friction material. In one specific embodiment of this invention the low friction material covering the plastic casing 2 was a metal coating which was deposited by vapor deposition or galvanically.

I claim:

1. A deflection fitting for safety belts to be mounted in motor vehicles, said deflection fitting having a slot defined between two spaced legs interconnected by a turning section, said slot being dimensioned for passing a safety belt webbing therethrough, said turning section which, in use, deflects said safety belt webbing, being provided with a casing of plastic material and having a surface coating of low friction material.

2. The deflection fitting according to claim 1 wherein said low friction material is a metallic coating.

* * * * *